3,518,049
CRYSTAL GROWTH IN AQUEOUS SOLUTION UTILIZING COMPLEXING AGENTS
Henry A. Kues, Jr., Carney, and John C. Murphy, Ellicott City, Md., assignors, by mesne assignments, to the United States of America as represented by the Secretary of the Navy
No Drawing. Filed Feb. 23, 1968, Ser. No. 707,468
Int. Cl. B01j 17/04
U.S. Cl. 23—50    3 Claims

ABSTRACT OF THE DISCLOSURE

A method for growing single crystals of technologically valuable compounds characterized by the diffusion of one ionic component of the desired crystal into a medium containing a complexed form of the second component of the crystal. An important feature of the invention is that the uncomplexed form of the second ionic component be relatively insoluble in the solvent medium in use. The method is particularly useful for growing single crystals of Group IV–B, Group II–B compounds in aqueous solution using a modified silica gel approach.

BACKGROUND OF THE INVENTION

Field of the invention

The present invention finds use in the field of crystallization and, more specifically relates to the growth of single crystals by the well-known silica gel process.

Description of the prior art

Numerous patents relating to silica gel processes exist. Crystallization from a silica gel is a well-known procedure, having been used for at least seventy-five years.

Growth of single crystals of solid materials requires that the instantaneous supersaturation of the solid phase relative to the dispersed phase be kept at a minimum. This general condition holds for crystal growth from a solvent medium, from a gas or from a melt. Procedures for single crystal growth differ essentially in the manner in which this low supersaturation is maintained. The more obvious differences in growth conditions i.e., temperature, pressure, etc., which distinguish the various methods are ordinarily consequences of this general condition. For example, simple growth of crystals from aqueous solution is accomplished either by slow evaporation of the solvent or by slow cooling or heating of the solution (depending on whether the solubility-temperature curve is normal or retrograde). In both cases the variation of the external parameter, evaporation rate or temperature controls the degree of instantaneous supersaturation and hence the rate of precipitation.

The silica gel method of crystal growth is subject to the above-mentioned condition. To illustrate, a typical prior art silica gel process consists of an addition of an acid to an aqueous solution of sodium metasilicate ($Na_2SiO_3 \cdot 9H_2O$) or ordinary water glass $$(Na_2O \cdot xSiO_2 \cdot nH_2O)$$

To this mixture is added a salt solution containing the X component of the desired crystal from MX. On standing, the solution sets to an elastic gel. After the gel has set, a salt solution containing the M component of the desired crystal form is caused to cover the gel. Crystals of the form MX will appear in the gel usually within a few hours. Of specific importance is the fact that the gel is a permeable medium into which diffusion can occur at room temperature. The rate of diffusion and hence the degree of supersaturation is determined by the density of the gel, the normality of the solutions containing M and X, and the temperature. Since this diffusion rate can be controlled, low solubility crystals which normally cannot be obtained from ordinary aqueous solution can be grown.

Two important characteristics of the abovedescribed system is the absence of competing chemical reactions and the fact of low solubility. These characteristics cause the failure of the prior art silica gel method in an attempt to grow single crystals of most divalent metallic sulfides and intermetallic compounds of similar type.

The present invention provides a method which enables the growth of crystals of these compounds while retaining the simplicity and convenience of the silica gel method. Since divalent sulfides, selenides, tellurides, and compounds such as gallium arsenide and indium antimonide are of considerable technological importance, the present method marks a significant advance in the field of crystal production.

SUMMARY

Growth of single crystals of certain divalent metallic sulfides and intermetallic compounds of similar type is achieved through a modification of the well-known silica gel process. In the above-given description of a typical silica gel process, a solution containing cation M of the desired crystal from MX was added to a prepared gel. In the present method, the metallic cations M are complexed in solution with a suitable agent such as disodium ethylenediamine tetraacetic acid (EDTA) before addition to the gel. At the time of this writing, single crystals of lead sulfide and cadmium sulfide have been grown by use of the present method. These compounds were previously unobtainable through use of prior art silica gel methods. The present method, in principle, is completely general and should find application to the crystal growth of other divalent metallic sulfides and related intermetallic compounds. Further, the mechanism is belived to proceed by an intermediate molecular complex, which, to the inventor's knowledge, would be the first example of the mechanism. Chelating agents other than EDTA should be useful in crystal growth by the present method.

DESCRIPTION OF THE PREFERRED EMBODIMENT

In order to describe the present method, the procedure employed in attempting to grow single crystals of lead sulfide using the prior art and present methods will be given. These methods are carried out under standard atmospheric conditions and at room temperature.

A comparative prior art method involves forming the gel with the addition of 100 ml. of sodium metasilicate solution of density 1.05 to a solution composed of 100 ml. of 1.0 N acetic acid and 20 ml. of 0.5 N lead acetate. To the gel thus formed is added a 0.1 N disodium sulfide solution in order to cover the gel. This method fails to produce crystal growth of the desired crystal, lead sulfide.

According to the present method, the gel is similarly formed by combination of 100 ml. of sodium metasilicate of density 1.05 with a solution composed of 100 ml. of 1.0 N acetic acid and 20 ml. of a lead acetate solution. The lead acetate solution in the instant method is a mixture of equal volumes of 0.5 N lead acetate and 0.5 N disodium EDTA. Thus, the lead ions in solution are complexed. To the gel thus formed is added a 0.1 N disodium sulfide solution in order, which covers the gel. On standing, single crystals of lead sulfide are produced.

The present method, in principle, is completely general and should apply to the various classes of compounds mentioned herein. The large number of possible chelating agent gives the procedure more general application than simply the use of disodium EDTA.

It is believed apparent that the practice of the present method is not limited to the particular description given herein. Variation in concentrations, densities, and materials used are to be expected and permitted within the scope of the appended claims.

What is claimed is:

1. A method for growing single crystals of the form MX wherein the cation M is selected from the group consisting of lead (II), cadmium (II), or mercury (II) and the anion X is selected from the group consisting of divalent sulfur, tellurium or selenium, the method comprising:

combining in solution the metal cation and an organic complexing agent capable of forming a soluble complex with the cation;

adding the aforementioned solution to a gel-forming substance to form an elastic gel; and, adding a second solution containing the anion to the elastic gel, whereupon single crystals of the form MX are formed in the gel.

2. The method of claim 1 wherein the organic complexing agent comprises disodium EDTA.

3. The method of claim 1 wherein the process is carried out in aqueous media.

References Cited

UNITED STATES PATENTS

| | | | |
|---|---|---|---|
| 3,301,660 | 1/1967 | Toshiaki Imamura | 148—1.6 X |
| 3,371,036 | 2/1968 | Torgeson et al. | 23—301 X |

OSCAR R. VERTIZ, Primary Examiner

GEORGE O. PETERS, Assistant Examiner

U.S. Cl. X.R.

23—134, 300, 304; 148—1.6